J. VON DER KAMMER.
PROCESS OF MANUFACTURING MALT.
APPLICATION FILED JUNE 19, 1913.
1,084,943.
Patented Jan. 20, 1914.
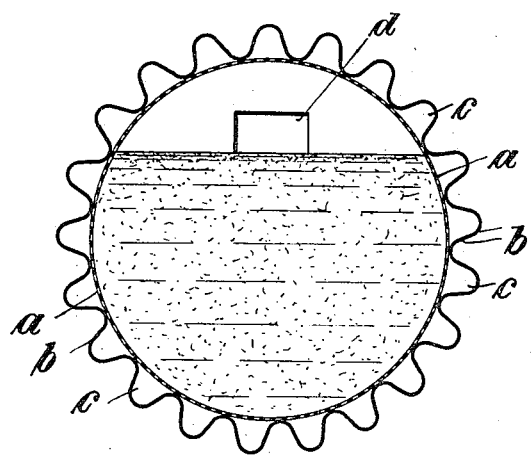
WITNESSES:
J. J. Wallace
William F. Martin
INVENTOR:
John von der Kammer,
By Attorneys,
Fraser, Durk & Myers

UNITED STATES PATENT OFFICE.

JOHN von der KAMMER, OF BERLIN, GERMANY, ASSIGNOR TO BERTHA von der KAMMER, OF CHICAGO, ILLINOIS.

PROCESS OF MANUFACTURING MALT.

1,084,943. Specification of Letters Patent. Patented Jan. 20, 1914.

Application filed June 19, 1913. Serial No. 774,617.

*To all whom it may concern:*

Be it known that I, JOHN VON DER KAMMER, a citizen of the United States of America, residing in Berlin, Germany, have invented certain new and useful Improvements in Processes of Manufacturing Malt, of which the following is a specification.

This invention relates to a process for manufacturing malt with the use of vegetable nourishing substances. Barley which has not been previously steeped, is repeatedly moistened with a solution of nourishing substances in a tightly closed tank for the purpose of obtaining preliminary germination, and after the discharges of the solution, it is left to itself in the tank which is again closed, until the greatest possible quantity of water has been absorbed. Thereupon the barley is continuously moved in the closed tank until the formation of enzyms and conversion into a complete state of mealiness, without any further addition of nourishing substances in order to prevent an over-germination.
A sectional view of an apparatus preferably employed in carrying out the present process is illustrated in the accompanying drawing.

A rotatable drum is preferably used as a germination tank, the wall of which may consist, as shown in the accompanying drawing, of a casing *a* of perforated sheet metal surrounded by a corrugated sheet metal casing *b* with the casing *a* resting on the corrugations. In that way, on the one hand, the casing *a* is strengthened, and, on the other hand, conduits *c* are formed through which the liquid escaping from the drum may be discharged.
The process is carried out in the following manner: The barley, without having been previously steeped, is placed in the drum, and then moistened with such a quantity of nourishing substance liquid that the said liquid submerges the barley. The impurities contained therein, rise to the surface, and are discharged through an opening *d* in one of the end walls of the drum. After a short action, for instance up to half an hour, it is discharged through the conduits *c*, and the apparatus is closed, so that air cannot enter from the outside. After the grain has been left to itself for several hours, nourishing liquid is again added. The moment for the supply of new nourishing liquid is indicated by the fact that the barley appears dry. This process is repeated three or four times or as many times until 30–36 hours have passed. Then no more nourishing liquid is supplied, but the barley is left to itself in the closed apparatus for 62–68 hours, according to the nature of the barley and to the kind of the nourishing substances, and then at once brought into the drying kiln. With the exception of short intervals for the supply and discharge of the nourishing substance solution, the drum is rotated during the whole of the process.
Owing to the barley which is to germinate, not having been previously steeped, as has been the rule hitherto, the substances of the grain intended for the germination and formation of enzyms are retained and utilized in the germinating process. Owing to that, the germination begins more quickly, and therefore enzyms are formed earlier. Both processes are assisted by the supply of nourishing solution, whereby the consumption of endosperm substances for nourishing the germs is limited or entirely avoided. Owing to the omission of steeping as a process separate and distinct from the process of germination and development of the enzyms, a considerable economy is moreover effected in the first cost and the cost of maintenance. Moreover, a complete swelling up of the barley and therefore a proper loosening up of the endosperm substance, is obtained. During the first six hours of the process there takes place, as shown by practical experiments, such a strong absorption of water that the increase in weight of the barley amounts to about 45%. After another six hours, it amounts to about 50%, and after the first period of the process, that is to say, during the first 30–36 hours, during which nourishing liquid is added, to about 60–70%. During the first period, a germination takes place with the formation of roots, the said germination being completed in the next 14–18 hours of the second period. At the same time, an over-germination is prevented not only by the complete suppression and consumption of nourishing substance solution and moisture, but also by the continuous movement of the barley. At the same time and during the next 48 hours, the multiplication and the activity of the enzyms continuously increase, and a conversion to a complete state of mealiness and therefore a better quality of the green malt is insured, and a higher yield of malt is obtained than with the known processes.

The kind of the nourishing substances depends on the nature and kind of the barley used for germination. It is necessary to use lime, nitrogen, potash and a carbo-hydrate, for instance sugar. A solution thereof is prepared, a quantity of each of these substances in proportion of 1:10000 or 15000 by weight is added to water. Instead of such a solution, it is possible of course to use also any other known solution, for instance Knop's solution, i. e. 4 gr. $CaN_2O_6$, 1 gr. $KNO_3$, 1 gr. $MgSO_4$, 1 gr. $H_2KPO_4$, .5 gr. $KCl$.

If the proportion of moisture in the barley, after the germination is completed, is too great, so that in spite of the motion, the grain can continue to germinate and the germination thus become excessive, the grain must be removed from the drum and dried in the open air, so as to bring about an immediate destruction of the roots. It is preferable to let the grain fall for the purpose through a warm current of air.

What I claim is:

1. The herein described process for the manufacture of malt which comprises moistening the grain with a nourishing solution in a drum, discharging the solution, closing the drum to exclude outside air, leaving the grain to itself for starting the growth, repeating the foregoing steps until the growth of the grain is nearly completed, and agitating and leaving the grain to itself closed within the drum, without any further supply of nourishing substances until the formation of enzyms is completed and the grain is converted to a complete state of mealiness.

2. The herein described process for the manufacture of malt which comprises moistening the grain with a nourishing solution in a drum, discharging the solution, closing the drum to exclude outside air, leaving the grain to itself for starting the growth, agitating, repeating the foregoing steps until the growth of the grain is nearly completed, and agitating and leaving the grain to itself closed within the drum, without any further supply of nourishing substances until the formation of enzyms is completed and the grain is converted to a complete state of mealiness.

In witness whereof, I have hereunto signed my name in the presence of two subscribing witnesses.

JOHN von der KAMMER.

Witnesses:
 HENRY HASPER,
 WOLDEMAR HAUPT.